(12) United States Patent
Gerber

(10) Patent No.: US 8,013,664 B2
(45) Date of Patent: Sep. 6, 2011

(54) CHARGE PUMP CONTROLLER AND METHOD THEREFOR

(75) Inventor: Remi Gerber, Pins Justaret (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 11/815,843

(22) PCT Filed: Aug. 28, 2006

(86) PCT No.: PCT/US2006/033773
§ 371 (c)(1),
(2), (4) Date: Mar. 19, 2010

(87) PCT Pub. No.: WO2008/027038
PCT Pub. Date: Mar. 6, 2008

(65) Prior Publication Data
US 2010/0277225 A1   Nov. 4, 2010

(51) Int. Cl.
G05F 1/10 (2006.01)
G05F 3/02 (2006.01)
(52) U.S. Cl. ............................................. 327/536
(58) Field of Classification Search .................. 327/536; 363/59–60
See application file for complete search history.

(56) References Cited

U.S. PATENT DOCUMENTS

| | | | |
|---|---|---|---|
| 6,411,531 B1* | 6/2002 | Nork et al. | 363/60 |
| 7,724,551 B2* | 5/2010 | Yanagida et al. | 363/60 |
| 2002/0075705 A1* | 6/2002 | Bayer et al. | 363/59 |
| 2007/0146051 A1* | 6/2007 | Tsen | 327/536 |
| 2008/0007980 A1* | 1/2008 | Fujiwara | 363/59 |

* cited by examiner

Primary Examiner — Quan Tra
(74) Attorney, Agent, or Firm — Robert F. Hightower

(57) ABSTRACT

A charge pump controller (20) comprises a configurable pump capacitor (15, 16). A charge pump controller (20) controls the charge supplied to a load (12) to be less than the charge stored on the pump capacitor (15, 16).

18 Claims, 3 Drawing Sheets

US 8,013,664 B2

CHARGE PUMP CONTROLLER AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form charge pump controllers. Charge pump controllers typically were circuits that stored a charge on capacitors to a voltage and configured the capacitors in parallel or in series to form output voltages that were greater than the input voltage. The charge pump controllers typically operated with a two phase clock where the capacitors were charged during one phase and were connected to supply the output voltage during the second phase. When the amount of current required by the load reduced to a small value, the charge pump controller typically did not accurately regulate the value of the output voltage. Under light load conditions, the output voltage typically had a large ripple voltage that degraded the operation of the load that received the voltage from the charge pump controller. One example of such a charge pump controller was disclosed in the data sheet for a part generally known as an LM2794 that was available from National Semiconductor Inc., of Santa Clara, Calif.

Accordingly, it is desirable to have a charge pump controller that has below ripple voltage.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
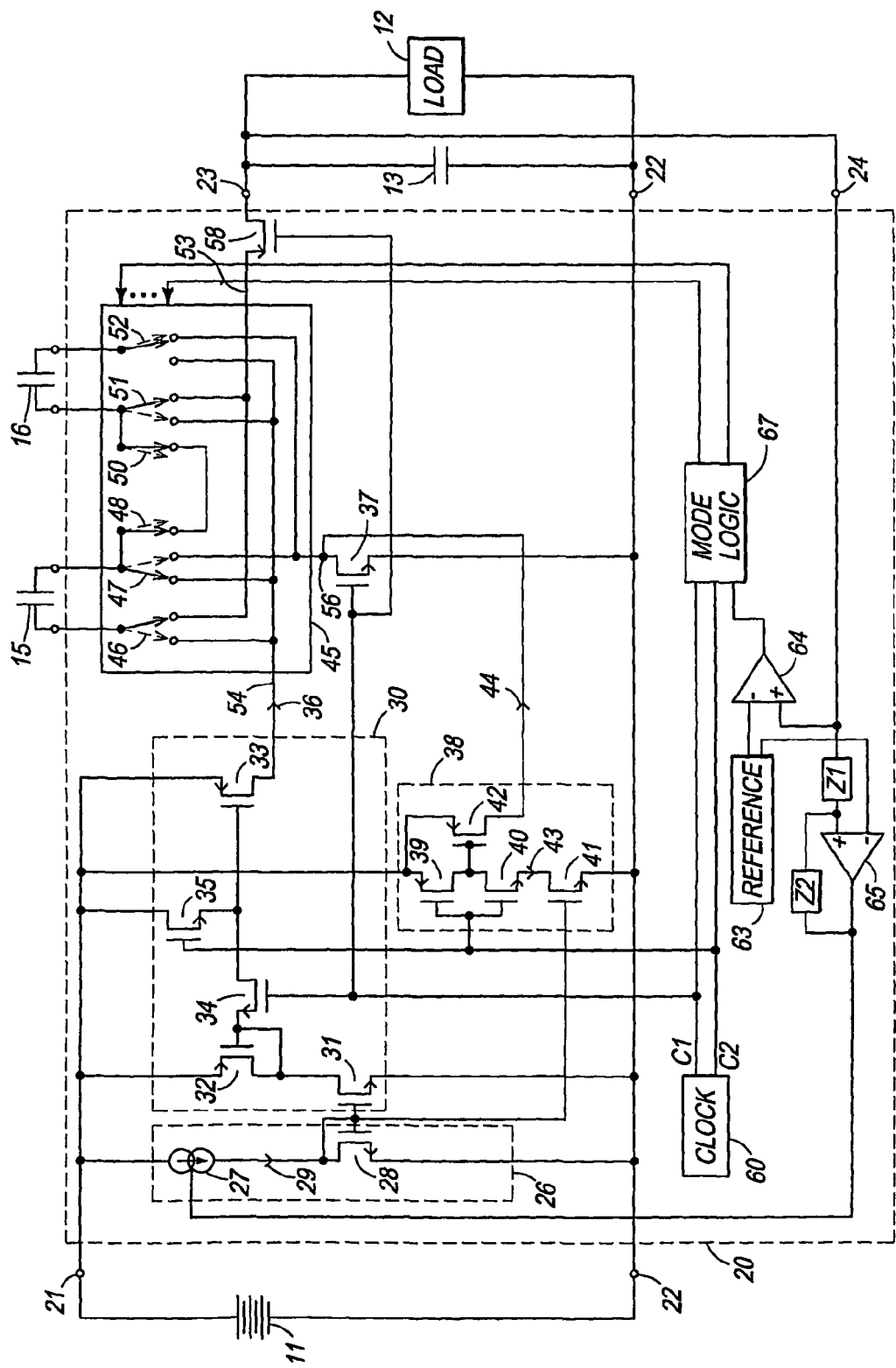
FIG. 1 schematically illustrates an embodiment of a portion of a charge pump system that includes an exemplary embodiment of a charge pump controller in accordance with the present invention.

FIG. 1 schematically illustrates an embodiment of a portion of a charge pump system 10 that utilizes an exemplary embodiment of a charge pump controller 20 to provide power for operating a load 12. Charge pump controller 20 is utilized to apply a charge onto pump capacitors 15 and 16 and then to use pump capacitors 15 and 16 to supply a charge to load 12 that is less than the charge applied to capacitors 15 and 16 during the charging mode. The charge supplied by controller 20 provides an output voltage and a load current to load 12. Pump capacitors 15 and 16 are usually external to controller 20. Controller 20 generally receives power from a dc voltage source, such as a battery 11, between a voltage input 21 and a voltage return 22 and provides the charge through output 23. A filter capacitor 13 may be connected between output 23 and return 22 in order to assist in providing the output voltage such as by storing the charge provided by controller 20. As will be seen further hereinafter, controller 20 controls the discharge current to be approximately equal to the charge current for values of the charge current that are greater than a first value and controls the discharge current to be less than the charge current for values of the charge current that are less than the first value.

Controller 20 typically includes a switch array or switch matrix 45 that has a plurality of switches, such as switches 46-48 and 50-52, that are used for selectively configuring capacitors 15 and 16 to be charged during a first time interval and to supply the charge to load 12 during a second time interval. Switches 46-48 and 50-82 generally are MOS transistors. Such switch matrices are well known to those skilled in the art. Controller 20 also typically includes an output control transistor 58, a current source 26, a charge control circuit 30, a discharge control circuit 38, a clock generator or clock 60, a reference voltage generator or reference 63, an error amplifier 65, a comparator 64, and mode control logic 67. Clock 60 generates two non-overlapping clocks labeled as C1 and C2 in FIG. 1. Clock C1 typically is high to represent a charging state of controller 20 that has a first time interval that is substantially equal to the time that C1 is high. Clock C2 generally is high for the second time interval to represent a discharge state of controller 20 during which capacitors 15 and 16 are utilized to supply the charge to capacitor 13 and load 12. Controller 20 receives a feedback (FB) signal on a feedback input 24 that is representative of the value of the output voltage between output 23 and return 22. In some embodiments, a resistor divider may be used to derive the FB signal from the output voltage as is well known to those skilled in the art. Comparator 64 receives the feedback signal and a reference voltage from reference 63 and forms an output that is low when the output voltage is less than a desired output voltage value. Mode control logic 67 receives the C1 and C2 clock signals and the output of comparator 64 and forms control signals that are used to control the configuration of switches 46-48 and 50-52 and the mode of controller 20. The mode control signals are utilized to configure the charging and discharging of capacitors 15 and 16 to provide an output voltage that can be greater than the value of the voltage from battery 11. For example, mode control logic 67 may configure capacitors 15 and 16 to provide a voltage that is 1.0, 1.5, or 2.0 times the value of the voltage received between input 21 and return 22. As illustrated in FIG. 1, controller 20 is configured to operate in a 2.0× multiplier mode. The charging configuration of switches 46-48 and switches 50-52 for this 2.0× multiplier mode are illustrated by dashed lines and the discharge configuration is illustrated by solid lines. Those skilled in the art will appreciate that controller 20 may have more pump capacitors than capacitors 15 and 16. In such a configuration with mode pump capacitors, matrix 45 would have more switches than the six switches shown in FIG. 1 and mode logic 67 would be configured to operate controller 20 to provide other output voltages that provide different multipliers such as a 1.3× and a 3.0× multiplier mode. Those skilled in the art will also appreciate that the output of comparator 64 is used by logic 67 to increase the multiplier mode as the value of the input voltage from battery 11 decreases in order to maintain the output voltage within the desired operating range.

Current source 26 includes a variable current source 27 that provides a variable current 29, and a current mirror transistor 28 that is used with other transistors to form current mirrors. Chare control circuit 30 includes a current mirror transistor 31 that together with transistor 28 forms a current mirror, and a selectable current mirror that is formed by a current mirror transistor 32 and a current mirror transistor 33 in addition to switch transistors 34 and 35. Discharge control circuit 38 includes a transistor 40, a transistor 39, a transistor 42, in addition to a current mirror transistor 41 that is coupled to form a current mirror with transistor 28.

Figure 2:
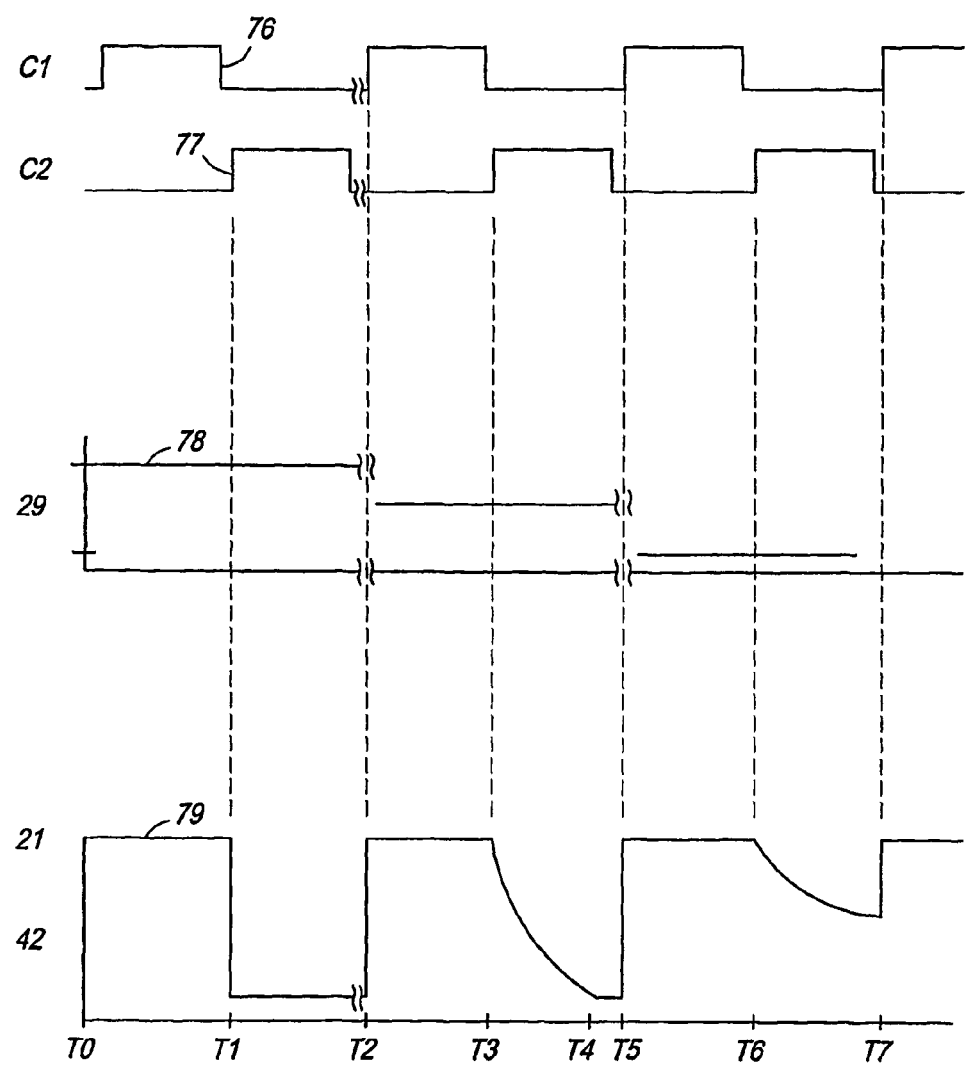
FIG. 2 is a graph having plots that illustrate some signals of the charge pump controller of FIG. 1 in accordance with the present invention.

FIG. 2 is a graph having plots that illustrate some signals of controller 20. The abscissa indicates time and the ordinate indicates increasing value of the signal of the illustrated signal. A plot 76 illustrates clock C1 and a plot 77 illustrates clock C2. A plot 78 illustrates current 29, and a plot 79 illustrates the voltage on the gate of transistor 42 relative to return 22. This description has references to FIG. 1 and FIG. 2.

In operation, clock 60 forces clock C1 high and clock C2 low to set controller 20 to operate in the charging mode or charging configuration, as illustrated at a time T0 in FIG. 2. Logic 67 receives C1 and C2 and configures matrix 45 to couple capacitors 15 and 16 in a charging configuration for the 2.0× multiplier mode. For the exemplary embodiment illustrated in FIG. 1, the charging configuration of switches 46-48 and 50-52 in the 2.0× multiplier mode is illustrated by dashed lines. Error amplifier 65 receives the FB signal and forms an error signal that indicates the amount that the output voltage deviates from the desired value of the output voltage. The error signal is used to vary the value of current 29 that is supplied by variable current source 27. As the value of the output voltage decreases, the error signal increases in order to increase the value of current 29. Current 29 flows from source 27 through transistor 28 and induces a substantially equal current to flow through transistors 31 and 32. Because clock C1 is high and clock C2 is low, transistor 34 is enabled and transistor 35 is disabled. With transistor 34 enabled, transistors 32 and 33 are coupled in a current mirror configuration that forms a charging current 36 flowing through transistor 33 that is derived from reference current 29. The value of current 36 relative to current 29 is controlled by the active area ratios between transistors 32 and 33 and the active area ratio between transistors 28 and 31. In the preferred embodiment, current 36 is approximately six thousand (6000) times the value of current 29. In the charging configuration, capacitor 15 is configured to receive charging current 36 through switch 46 and capacitor 16 is configured to receive charging current 36 through switch 51. The high from clock C1 also enables transistor 37 which connects the other terminal of capacitors 15 and 16 to return 22 through respective switches 47 and 52. The current mirror configuration of transistors 28 and 41 forms a current 43 that flows through transistor 41. The value of current 43 is determined by the ratio of the active areas of transistors 28 and 41. In the preferred embodiment, current 43 is approximately five hundred (500) times current 29. The low from clock C2 disables transistor 40 and enables transistor 39 which couples the gate of transistor 42 to input 21 thereby disabling transistor 42. Since transistor 42 is disabled, discharge control circuit 38 does not affect the charging of capacitors 15 and 16.

At a time T1, clock 60 forces clock C1 low and clock C2 high to control controller 20 to operate in the discharging mode or discharging configuration such as for the 2.0× multiplier mode. The low C1 clock disables transistor 34 and the high C2 clock enables transistor 35 which disables transistor 33 thereby preventing circuit 30 from generating current 36. Logic 67 receives the low clock C1 and the high C2 clock and sets the configuration of switches 46-48 and 50-52 to the positions illustrated by the solid lines in order to configure capacitors 15 and 16 to supply a charge through output 23 to load 12 and capacitor 13 in order to provide an output voltage to load 12. Capacitor 15 is configured to supply charge to output 23 through switch 46. Capacitor 15 is connected to capacitor 16 through switches 48 and 50, end capacitor 16 is connected to a reference voltage through switch 52. The low C1 clock also enables output transistor 58 to connect an output 53 of matrix 45 to output 23.

The high C2 clock disables transistor 39 and enables transistor 40. Disabling transistor 39 decouples the gate of transistor 42 from input 21, and enabling transistor 40 allows transistor 41 to control the gate voltage of transistor 42. If error amplifier 65 provides a large error signal, source 27 provides a high value of current 29. At high values of current 29, the gate-to-source voltage (Vgs) of transistor 28 is large which forces the gate-to-source voltage (Vgs) of transistor 41 to also be large. As is well known in the art, the impedance of an MOS transistor, such as transistor 41, is inversely proportional to the value of the Vgs of the transistor. Thus, the high Vgs voltage of transistor 41 provides a low impedance for transistor 41. The low impedance allows transistor 41 to quickly discharge the gate-to-source capacitance of transistor 42 and pull the gate of transistor 42 low as illustrated by plot 79 between times T1 and T2. As transistor 42 begins conducting, the voltage on node 56 is pulled to substantially the value of the voltage on return 22. With node 56 at the voltage of return 22, the value of discharge current 44, and the current supplied to output 23, is approximately equal to current 36 that was supplied during the charging configuration between times T0 and T1. Since transistor 42 is enabled approximately the entire time interval of C2, the amount of charge coupled to load 12 is approximately equal to the amount of charge coupled to capacitors 15 and 16 by current 36.

However, if the amount of current required by load 12 decreases, the voltage between output 23 and return 22 increases and the error signal decreases which decreases the value of current 29. At lower values of the load current required by load 12, controller 20 reduces the amount of charge coupled from capacitors 15 and 16 to output 23 during the discharge configuration to be less than the amount of charge applied to capacitors 15 and 16 by current 36 during the charge configuration. This assists in minimizing ripple in the output voltage between output 23 and return 22. At lower values of current 29, the Vgs of transistor 28 is smaller which forces the Vgs of transistor 41 to also be smaller. Since the impedance of transistor 41 is inversely proportional to the value of the Vgs, thus the value of current 29, the impedance of transistor 41 increases. The impedance of transistor 41, thus the value of current 29, controls how fast the voltage on the gate of transistor 42 decays, thus, controls the point during the period of clock C2 that transistor 42 begins conducting, controls the amount of the time interval of C2 that transistor 42 conducts, and controls the value of current 44 conducted by transistor 42. Preferably, transistor 41 is designed so that for values of current 29, thus current 36, that are less than a first value, the Vgs of transistor 41 is not sufficiently large enough, thus the impedance is not small enough, to completely enable transistor 42 for the full time interval that C2 is high. This first value of the output voltage and the corresponding first value of current 29, thus current 36, is selected to be a value at which the output voltage would have excessive ripple if the value of the discharge current were not decreased. The first value of current 29 generally is selected to be no greater than about ten percent of the maximum value of current 29. As illustrated between times T2 and T3, the value of the output voltage increases which decreases the value of current 29 during the charging configuration. At a time T3, C2 goes high to disable transistor 39 and enable transistor 40. Since current 29 is lower, the Vgs of transistor 41 is lower and the impedance is higher. Transistor 41 begins discharging the gate capacitance of transistor 42 and begins pulling the gate of transistor 42 toward the voltage of return 22. But the higher impedance of transistor 41 increases the time needed to discharge the gate capacitance and transistor 41 slowly enables transistor 42. Transistor 42 begins conducting as the Vgs of transistor 42 reaches the minimum threshold voltage and operates in the linear mode until Vgs further increases. As the Vgs of transistor 42 increases between T3 and T4, the value of current 44 also slowly increases until it reaches at a time T4 the value that was formed for current 36 during the charging configuration between T1 and T2. The lower average value of current 44 between T3 and T4 reduces the amount of charge that is coupled to output 23. Additionally, the small portion of the C2 time interval that current 44 is equal to current 36 also reduces the amount of charge. Thus, the total charge supplied to output 23 from capacitors 15 and 16 is less than the amount of charge that was stored on capacitors 15 and 16 by current 36. At time T5, clock C1 goes high to place controller 20 in the charging configuration. As illustrated by plot 78, the output voltage increased and current 29 is again decreased, thus, the value of changing current 36 also decreased. At a time T6, clock C1 goes low and C2 goes high to place circuit 20 in the discharge configuration. The lower value of current 29 again reduces the Vgs and impedance of transistor 41. The lower impedance further increases the time required to enable transistor 42 to a time that is greater than the time interval of C2. As the Vgs of transistor 42 increases between T6 and T7, the value of current 44 slowly increases but does not reach the value that was formed for current 36 during the charging configuration between T5 and T6. The lower average value of current 44 over the time interval of C2 between times T6 and T7 reduces the amount of charge that is supplied to output 23 to be less than the amount of charge that was stored on capacitors 15 and 16 by current 36 between times T5 and T6. The active area and the gate capacitance of transistor 42 generally is larger while the active area of transistor 41 is selected to be smaller than the active area of transistor 42 so that the impedance of transistor 41 may provide the desired control of transistor 42.

In one example embodiment, source 27 varied the value of current 29 from about ten milli-amperes to about seven hundred milli-amperes (10-700 ma) responsively to the value of the FB signal. Thus, current 36 varied over this same range. However, transistor 41 was selected to form current 44 approximately equal to the value of current 29 for values of current 29 that were greater than a first value of about twenty milli-amperes (20 ma) and to form the average value of current 44 less than the value current 29 for smaller values of current 29. For example, for the average value of current 29 over the charge time interval of approximately equal to ten milli-amperes (10 ma), the average value of current 44 over the discharge time interval (C2) was approximately one milli-ampere (1 ma) and for current 29 approximately equal to fifteen milli-amperes (15 ma), the average value of current 44 was approximately tem milli-amperes (10 ma). As can be seen, for this example the twenty milli-amperes (20 ma) first value of current 29 was approximately 2.8% of the maximum value of about seven hundred milli-amperes (700 ma).

In order to facilitate this functionality for controller 20, input 21 is connected to a first terminal of current source 27. A second terminal of current source 27 is commonly connected to a drain and a gate of transistor 28, a gate of transistor 31, and a gate of transistor 41. A source of transistor 28 is connected to return 22. A source of transistor 32 is connected to input 21. A gate of transistor 32 is commonly connected to a source of transistor 34, a drain of transistor 32, and a drain of transistor 31. A source of transistor 31 is connected to return 22. A drain of transistor 34 is commonly connected to a source of transistor 35 and a gate of transistor 33. A gate of transistor 34 is commonly connected to a gate of transistor 58, a gate of transistor 37, a first input of logic 67, and output C1 of clock 60. A gate of transistor 35 is commonly connected to a gate of transistor 39, a gate of transistor 40, a second input of logic 67, and the C2 output of clock 60. A drain of transistor 35 is connected to input 21. A source of transistor 33 is connected to input 21 and a drain is connected to input 54 of matrix 45. A source of transistor 39 is commonly connected to input 21 and a source of transistor 42. A drain of transistor 39 is commonly connected to a gate of transistor 42 and a drain of transistor 40 which has a source connected to a drain of transistor 41. A drain of transistor 42 is connected to node 56 and an input of matrix 45. A source of transistor 41 is connected to return 22. A source of transistor 37 is connected to return 22 and a drain is connected to node 56. A source of transistor 58 is connected to output 53 of matrix 45 and a drain is connected to output 23. The output of reference 63 is connected to an inverting input of comparator 64 which has a non-inverting input connected to input 24. An output of comparator 64 is connected to a third input of logic 67. The mode control outputs of logic 67 are connected to mode control inputs of matrix 45.

Figure 3:
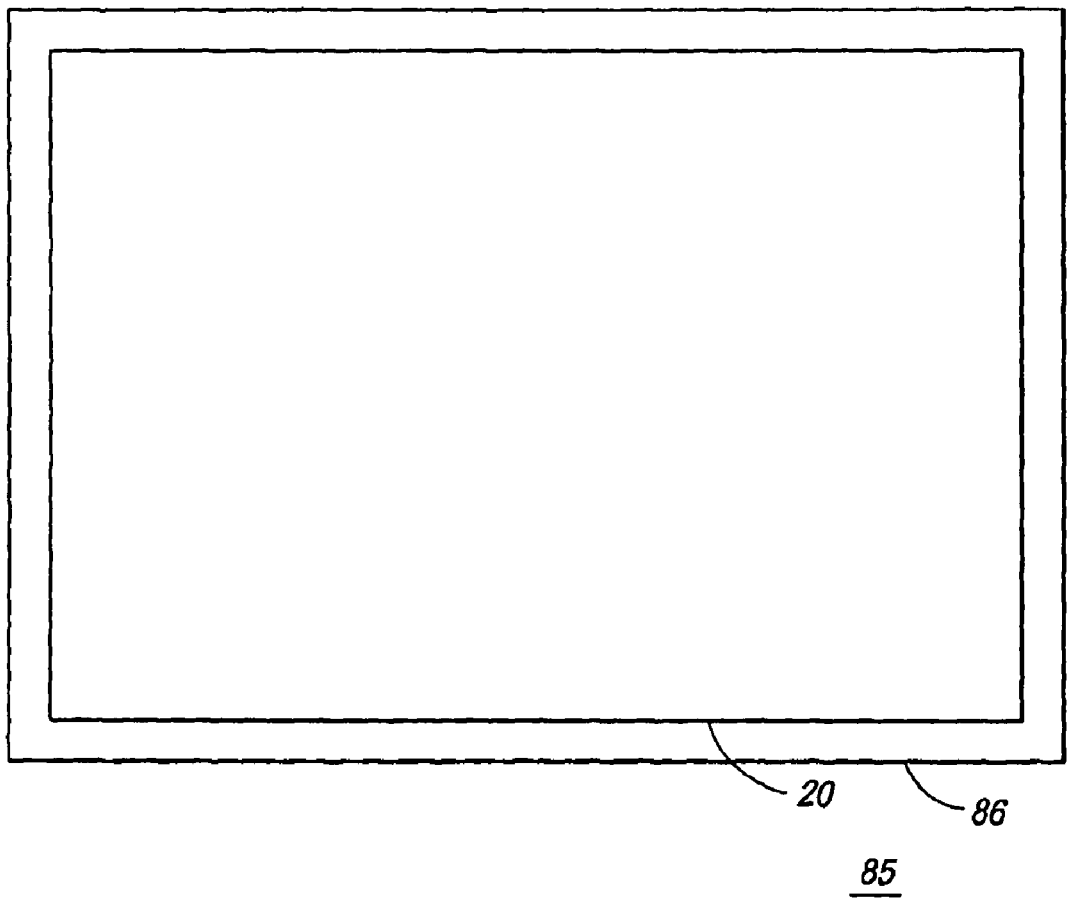
FIG. 3 schematically illustrates an enlarged plan view of a semiconductor device that includes the charge pump controller of FIG. 1 in accordance with the present invention.

FIG. 3 schematically illustrates an enlarged plan view of a portion of an embodiment of a semiconductor device or integrated circuit 85 that is formed on a semiconductor die 86. Controller 20 is formed on die 86. Die 86 may also include other circuits that are not shown in FIG. 3 for simplicity of the drawing. Controller 20 and device or integrated circuit 85 are formed on die 86 by semiconductor manufacturing techniques that are well known to those skilled in the art.

In view of all of the above, it is evident that a novel device and method is disclosed. Included, among other features, is charging a pump capacitor store a first charge during a charging mode and to couple a portion of the stored charge to an external load through an output of the charge pump controller during a discharge mode.

While the subject matter of the invention is described with specific preferred embodiments, it is evident that many alternatives and variations will be apparent to those skilled in the semiconductor arts. More specifically the subject matter of the invention has been described for particular N-channel and P-channel MOS transistors, although the method is directly applicable to other MOS transistors, as well as to bipolar, BiCMOS, matter of the invention has been described for particular N-channel and P-channel MOS transistors, although the method is directly applicable to other MOS transistors, as well as to bipolar, BiCMOS, and other transistor structures. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A charge pump controller comprising:
a configurable pump capacitor;
a control circuit configured to couple the configurable pump capacitor in a charging configuration for a first time interval and to couple the configurable pump capacitor in a discharge configuration for a second time interval;
a current source configured to provide a reference current;
a charging circuit configured to form a charging current that is proportional to the reference current and to couple the charging current to the configurable pump capacitor to store a charge of a first value on the configurable pump capacitor responsively to the first time interval; and
a discharge circuit configured to operate in a first state or a second state responsively to a first value of the reference current, the discharge circuit configured to limit charge coupled from the configurable pump capacitor to a load during the second time interval to approximately the first value responsively to the first state and to limit charge coupled from the configurable pump capacitor to the load during the second time interval to less than the first value responsively to the second state, the discharge circuit including a first current mirror configured to form a first current that is proportional to the reference current, a first transistor coupled to receive the first current responsively to the second time interval, and a second transistor that controls charge coupled from the configurable pump capacitor to the load to no greater than approximately the first value.

2. The charge pump controller of claim 1 wherein the first transistor controls a portion of the second time interval that the second transistor is enabled.

3. The charge pump controller of claim 2 wherein the second transistor has a larger active area than the first transistor.

4. The charge pump controller of claim 1 wherein a control electrode of the first transistor is coupled to receive a signal representative of the reference current and a first current carrying electrode is coupled to control a control electrode of the second transistor, the second transistor including a first current carrying electrode coupled to a switch matrix of the charge pump controller and a second current carrying electrode coupled to receive a power supply voltage.

5. The charge pump controller of claim 1 further including a third transistor operably coupled to disable the second transistor during the first time interval and a fourth transistor configured to couple first transistor to the second transistor during the second time interval.

6. The charge pump controller of claim 1 wherein the first value of the reference current is no greater than approximately ten percent of a maximum value of the reference current.

7. A method of forming a charge pump controller comprising:
configuring the charge pump controller to supply a first charge to a pump capacitor during a charging configuration of the charge pump controller;
configuring the charge pump controller to supply a second charge from the pump capacitor to a load that is external to the charge pump controller during a discharge configuration of the charge pump controller wherein the second charge is less than the first charge, including configuring a reference circuit to form a reference current that varies responsively to an output voltage formed by the charge pump controller; and
configuring a discharge circuit to form the second charge responsively to a first value of the output voltage.

8. The method of claim 7 wherein configuring the charge pump controller to supply the first charge to the pump capacitor during the charging configuration includes configuring the charge pump controller to control the first value responsively to a feedback signal that is representative of an output voltage formed by the charge pump controller.

9. The method of claim 7 wherein configuring the charge pump controller to supply the first charge to the pump capacitor during the charging configuration includes configuring the charge pump controller to form a reference current that is used to form the first charge and to control the second charge to be less than the first charge responsively to a first value of the reference current.

10. The method of claim 9 further including configuring the charge pump controller to supply a third charge from the pump capacitor to the load during the discharge configuration for values of the reference current that are greater than the first value of the reference current wherein the third charge is approximately the same as the first charge.

11. The method of claim 7 wherein configuring the discharge circuit to form the second charge responsively to the first value of the output voltage includes coupling a first transistor to receive the reference current and vary an impedance of the first transistor responsively to the reference current.

12. The method of claim 11 further including coupling a second transistor to form the second charge responsively to the impedance of the first transistor.

13. The method of claim 12 further including configuring the discharge circuit to disable the second transistor responsively to the charging configuration.

14. The method of claim 7 wherein configuring the charge pump controller to supply the second charge from the pump capacitor includes configuring the charge pump controller to supply the second charge for a time interval that is less than a time interval of the discharge configuration.

15. The method of claim 7 wherein configuring the charge pump controller to supply the second charge includes configuring the charge pump controller to supply the second charge that is less than the first charge responsively to a first value of an output voltage formed by the charge pump controller.

16. A charge pump method comprising:
charging a pump capacitor of a charge pump controller to a first charge with a first current value during a charging configuration of the charge pump controller;
coupling a second charge from the pump capacitor to a load of the charge pump controller during a discharge configuration of the charge pump controller;
configuring a discharge circuit to form a reference current responsively to a value of an output voltage; and
controlling the second charge to be less than the first charge responsively to a first value of the output voltage that is formed by the charge pump controller by varying an impedance of a first transistor responsively to the reference current.

17. The method of claim 16 further including controlling the second charge to be substantially equal to the first charge responsively to the output voltage being less than the first value.

18. The method of claim 16 wherein controlling the second charge to be less than the first charge includes coupling the pump capacitor to supply the second charge for a time interval that is less than a time interval of the discharge configuration.

* * * * *